United States Patent [19]

Comment

[11] Patent Number: 5,213,132
[45] Date of Patent: May 25, 1993

[54] AUTOMATIC REGULATING VALVE

[75] Inventor: Paul Comment, Courgenay, Switzerland

[73] Assignee: Hobac S.A., Neuchatel, Switzerland

[21] Appl. No.: 820,892

[22] PCT Filed: May 16, 1991

[86] PCT No.: PCT/CH91/00115

§ 371 Date: Jan. 15, 1992

§ 102(e) Date: Jan. 15, 1992

[87] PCT Pub. No.: WO91/18337

PCT Pub. Date: Nov. 28, 1991

[30] Foreign Application Priority Data

May 18, 1990 [CH] Switzerland ............... 1704/90

[51] Int. Cl.$^5$ ........................................... G05D 16/10
[52] U.S. Cl. ........................... 137/505.25; 137/505.38;
137/509; 137/614.14
[58] Field of Search .............. 137/505, 505.25, 505.38,
137/509, 614.14

[56] References Cited

U.S. PATENT DOCUMENTS

| | | | |
|---|---|---|---|
| 540,154 | 5/1895 | Dreisoerner | 137/505.25 |
| 2,596,368 | 5/1952 | Brunton | 137/509 X |
| 3,454,041 | 7/1969 | Masson | 137/505.25 |
| 3,580,274 | 5/1971 | Hansen | 137/509 X |
| 4,121,619 | 10/1978 | Paulinkonis | 137/509 X |
| 4,543,985 | 10/1985 | Healy et al. | 137/505.25 |
| 4,611,625 | 9/1986 | Bugaenko et al. | 137/505.25 |
| 4,620,562 | 11/1986 | Pacht | 137/509 X |
| 4,922,955 | 5/1990 | Uri | 137/505.25 X |

Primary Examiner—Stephen M. Hepperle
Attorney, Agent, or Firm—Kane, Dalsimer, Sullivan, Kurucz, Levy, Eisele and Richard

[57] ABSTRACT

The valve comprises a shutter (8) constituted by a body of revolution housed in a chamber (4) also comprising a spring (15) maintaining the shutter in the closed position. The shutter (8) has a cylindrical portion provided with a leaktight seal (9) moving in a bore (5), a frustoconical portion (10) located facing a frustoconical portion (6) of the chamber and at least one passage (12, 13) between the frustoconical portion (6) and the front portion of the shutter. The valve is provided with an inlet conduit (16) emerging into the frustoconical portion (6) and an outlet conduit (17). A pressure in the inlet conduit (16) causes the shutter, whose frustoconical portion tends to close the inlet conduit (16), to move back. An equilibrium is produced between the pressure on the shutter (8) and the thrust of the spring (15).

7 Claims, 4 Drawing Sheets

AUTOMATIC REGULATING VALVE

FIELD OF THE INVENTION

The subject of the present invention is an automatic regulating valve for pressurized fluid, comprising a valve body comprising a chamber having a cylindrical bore, at least one lateral inlet orifice for the fluid, at least one frontal outlet orifice and at least one orifice bringing into permanent communication the bottom of the cylindrical bore and of the chamber with the outside, a shutter constituted by a body of revolution which is axially movable in said chamber and a cylindrical portion of which, engaged in the cylindrical bore of the chamber, is provided with a sealing ring, and a spring working in compression between the shutter and the bottom of the cylindrical bore in order to maintain the shutter closed, the inlet orifice emerging between said seal and the outlet orifice, the valve furthermore being arranged such that the passage cross-section between the shutter and the wall of the chamber decreases when the shutter moves back under the effect of the pressure of the fluid.

PRIOR ART

Such valves are already known from the International Patent Application WO 86/04163. In one of these valves, the shutter is constituted by a first piston provided with a ring and connected via a rod to a second piston which is also provided with a ring. The chamber has to have an accurate bore which is relatively long and tricky to produce, in particular when the valve is produced from injected synthetic material. In the other valve, the shutter also has a piston rod integral with a piston provided with an O-ring. The bore is substantially shorter, but the chamber is constituted by several portions. Furthermore, in the two valves, the passage of the fluid is performed through a longitudinal slot made in the wall of the bore, below the O-ring seal of one of the pistons. Of course, this slot requires special means for obtaining it.

The object of the present invention is to produce a valve of simpler manufacture and, consequently, of a lower cost price, the cost price being an essential factor in the case of mass manufacture.

SUMMARY OF THE INVENTION

In the valve according to the invention, the chamber has a frustoconical portion into which the inlet orifice emerges and the shutter has, in front of the cylindrical portion provided with said ring, a frustoconical portion similar to that of the chamber and at least one passage between this frustoconical portion and the front of the shutter, the length of the frustoconical portion of the shutter being such that, in the closed position, a space remains between the frustoconical surfaces of the shutter and the chamber.

The shutter has a simple shape, particularly if the passages are constituted by simple grooves or flats. The chamber does not comprise slots. Only the frustoconical portions have to be produced accurately. The shutter may be very short or provided with a rod whose end engages with a valve seat surrounding the outlet orifice. The latter construction lends itself particularly well to dispensing viscous products.

BRIEF DESCRIPTION OF THE DRAWINGS

The attached drawing represents, by way of example, two embodiments of the invention.

DESCRIPTION OF THE PREFERRED EMBODIMENT(S)

Figure 1:
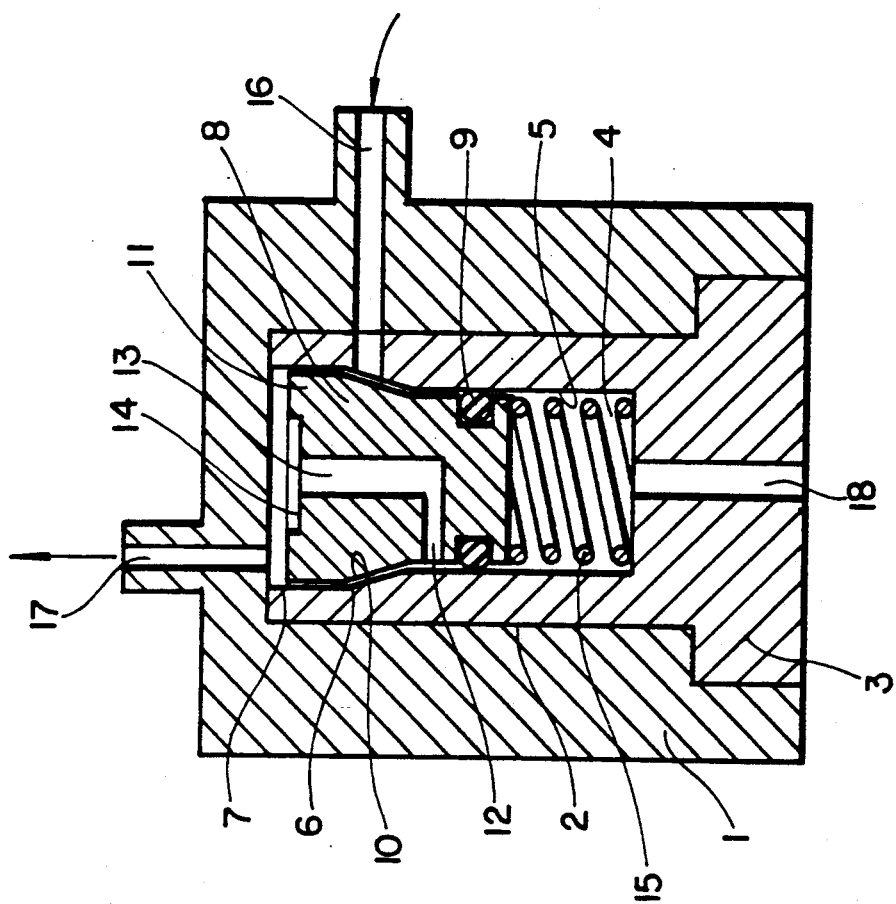
FIG. 1 is a view, in axial cross-section, of a first embodiment of the valve in the rest position.
Figure 2:
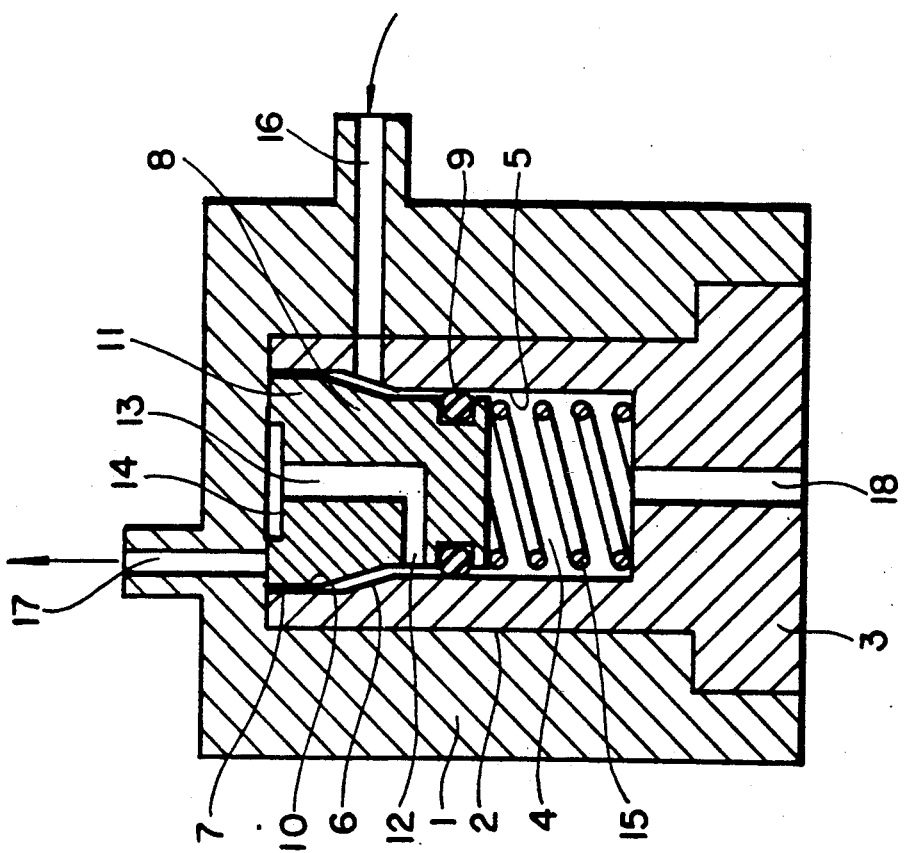
FIG. 2 represents the same valve in the opened position for the inlet of a pressurized fluid.

The valve represented in FIGS. 1 and 2 comprises a valve body constituted by a first cylindrical part 1 having an axial cylindrical hollow 2 into which is fitted a second cylindrical part 3 in which an essentially cylindrical chamber 4 is formed. The parts 1 and 3 are welded, bonded or driven in depending on the material used. The chamber 4 has a cylindrical bore 5, a frustoconical intermediate portion 6 and then a second cylindrical portion 7 which is relatively short. The valve furthermore comprises a shutter 8 constituted by a body of revolution which is in the form of a slide having a cylindrical portion provided with a leaktight seal constituted by a O-ring seal 9 disposed in the bore 5 of the chamber, a frustoconical intermediate portion 10 similar to the frustoconical portion 6 of the chamber and then a cylindrical portion 11 of shorter length than the cylindrical portion 7 of the chamber and able to be displaced in the latter with a slight clearance. The shutter 8 furthermore has a radial conduit 12 emerging into the small-diameter cylindrical portion of the shutter and a non-traversing axial conduit 13 communicating with the radial conduit 12 and emerging, at the front of the shutter, into a counterbore 14.

A spring 15, working in compression, is mounted in the chamber between the shutter 8 and the bottom of the chamber 4. The valve has a lateral inlet conduit 16 emerging into the frustoconical portion 6 of the chamber, an outlet conduit 17 closed, at rest, by the shutter 8 and a hole 18 causing the bottom of the chamber 5 to communicate permanently with the outside.

At rest, that is to say when no pressurized fluid comes into the inlet conduit, the orifice of the radial conduit 12 of the shutter is located at the narrowest end of the frustoconical portion 6 of the chamber. This position does not need to be defined accurately. Furthermore, a space separates the frustoconical portion 6 of the chamber from the frustoconical portion 10 of the shutter, as shown in FIG. 1.

When a pressurized fluid penetrates into the valve via the conduit 16, it penetrates into the shutter 8 via the radial conduit 12 and the axial conduit 13. The pressure developed in the shutter 8 has the effect of causing this shutter to move back by compressing the spring 15, that is to say to open the valve, the fluid then being able to exit via the outlet conduit 17. As the shutter 8 moves back, its frustoconical portion 10 is applied against the frustoconical portion 6 of the chamber, which has the effect of closing the inner orifice of the inlet conduit 16. The pressure then drops in the shutter 8, such that the shutter moves forward under the thrust of the spring 15, enabling the fluid to enter into the valve once again. This establishes a rapidly damped oscillation which results in an equilibrium state. The pressure of the fluid at the outlet of the valve is in practice regulated to a value determined by the spring 15.

If it is desired to be able to change the pressure of the fluid at the outlet of the valve, it is possible simply to provide the valve with a calibration screw for the spring 15, giving the spring the necessary precompression. The hole 18 may be provided along the axis of this screw.

The valve may be manufactured from metal or from synthetic material.

It may be noted that the cylindrical portions 7 and 11 of the chamber 4 and of the shutter, respectively, are not absolutely necessary for the operation of the valve. The cylindrical portions serve to guide and center the shutter 8. The clearance between these cylindrical portions may be simply 0.1 or 0.2 mm. It may also be noted that the cylindrical bore 5 does not need to be accurate, given that a large clearance exits between the shutter and this bore, the clearance being taken up by the O-ring seal 9. Given this clearance, the position of the orifice of the radial conduit 12 does not need to be accurate, the fluid, gaseous or liquid, being able to flow both into the frustoconical space and into the cylindrical space.

The valve described is, of course, capable of numerous alternative forms. The shutter 8 could especially have a plurality of radial conduits, indeed a plurality of axial channels. The frontal portion of the shutter could differ from the shape shown. The conduits 16 and 17 and the hole 18 could be orientated differently. It will be noted that the position of the inner orifice of the conduit 16 does not need to be accurate. The sole portions which have to be accurate are the frustoconical portions 6 and 10.

Figure 3:
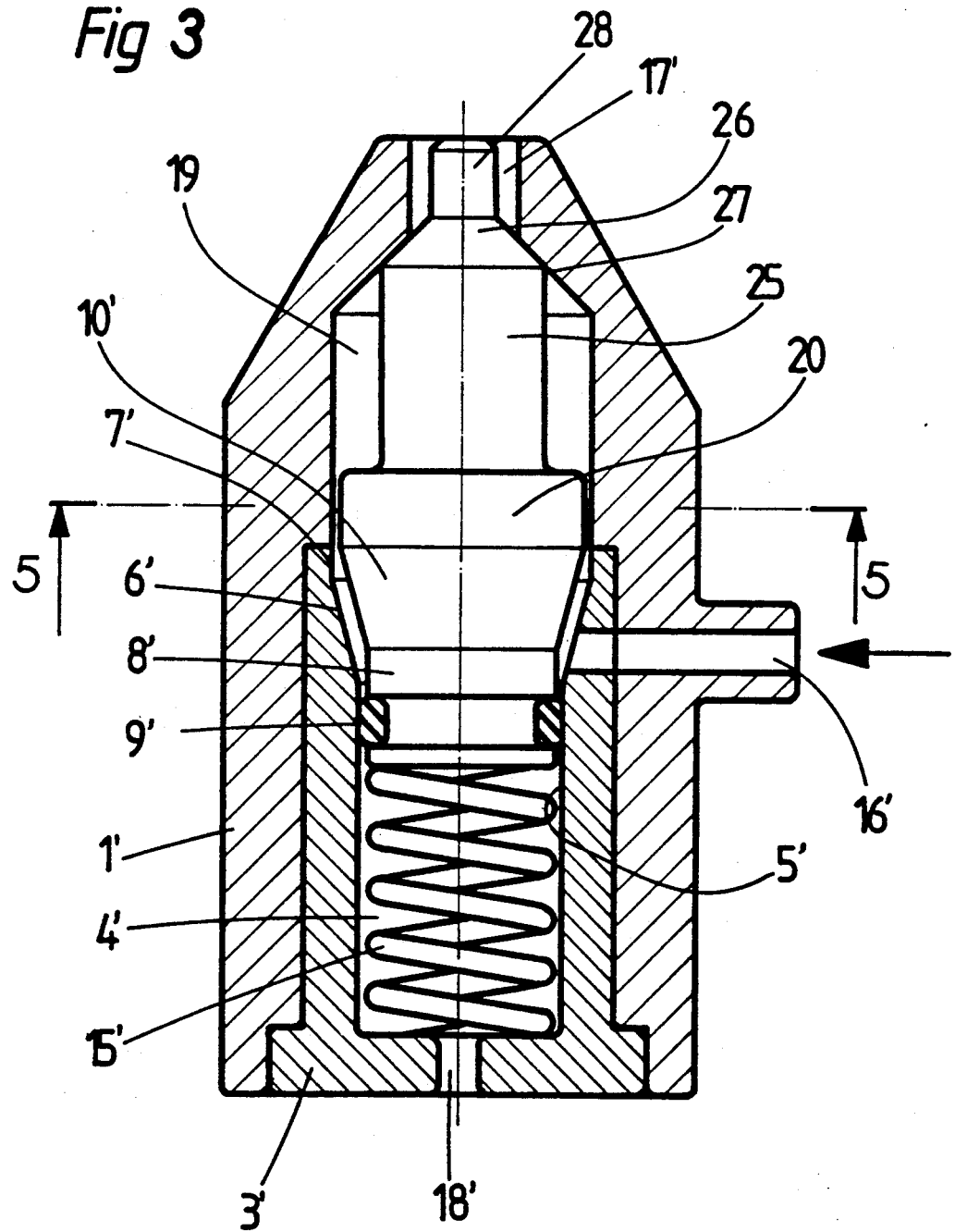
FIG. 3 is a view, in axial cross-section, of a second embodiment in the closed rest position.
Figure 4:
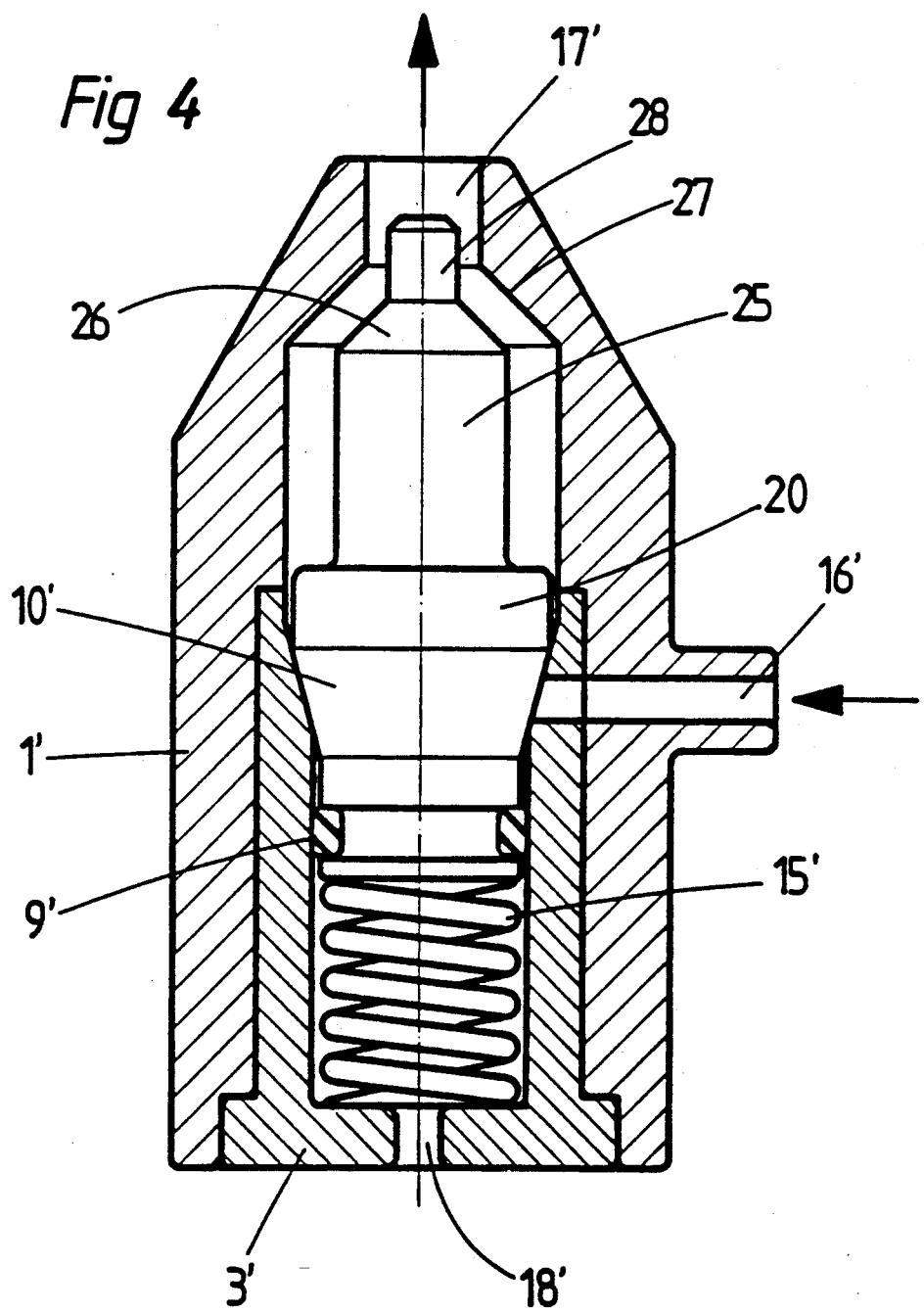
FIG. 4 is a view of the same valve in the opened position for the inlet of a pressurized fluid.
Figure 5:
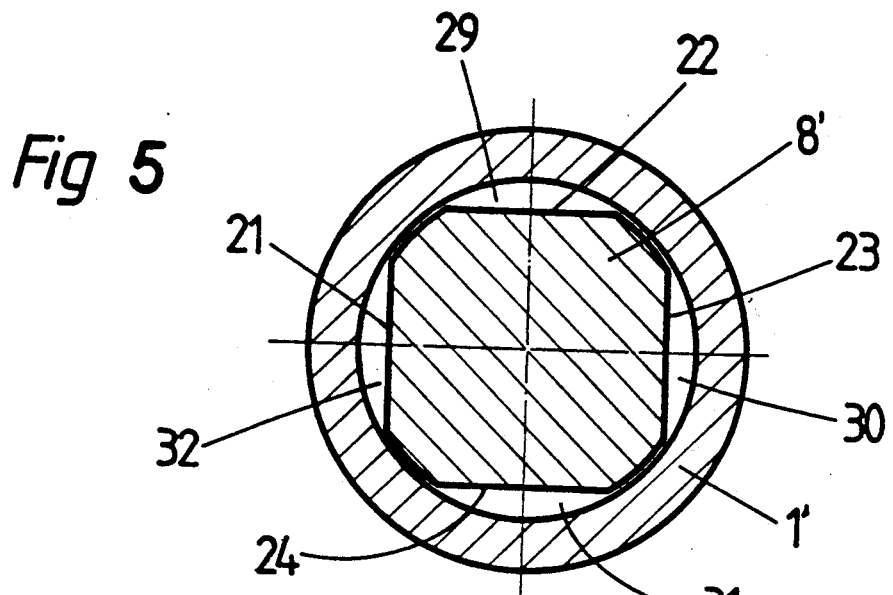
FIG. 5 is a view, in cross-section along V—V of FIG. 3.

A second embodiment will now be described in relation to FIGS. 3 to 5.

In order to avoid repetitions, the parts identical to the parts of the first embodiment, or which have undergone only a dimensional change, have been designated by the same references appended by the prime symbol.

Again, therefore, there is a valve body constituted by two parts 1' and 3', a cylindrical chamber 4' having a bore 5', a frustoconical portion 6' and a cylindrical portion 7', a shutter 8' having a frustoconical intermediate portion 10' similar to the frustoconical portion 6', an O-ring seal 9', a lateral inlet conduit 16', an outlet conduit 17' closed, at rest, by the shutter 8' and a pressure-equilibrating hole 18'.

This second embodiment differs essentially from the first embodiment in that the cylindrical portion 7' of the chamber 4' is prolonged into the portion 1' of the valve body by a chamber 19 extending in the direction of the outlet orifice 17' and in that the passage between the frustoconical portion 10' of the shutter and the front of the shutter is produced at the periphery of the cylindrical portion 20 of the shutter, which cylindrical portion is located in front of the frustoconical portion. These passages 29, 30, 31, 32 are constituted, for example, by four flats 21, 22, 23, 24 such as shown in FIG. 5. It is clear that such a passage shape may be produced more easily than the conduits 12 and 13 of the first embodiment.

The shutter 8' is furthermore prolonged by a cylindrical portion 25 of diameter substantially less than the diameter of the chamber 19. A frustoconical portion 26, engaging with a frustoconical shutter seat 27 for closing the valve, is formed at the end of this lengthened portion 25. The shutter is terminated by a cylindrical portion 28 of diameter substantially less than the diameter of the outlet orifice 17' and intended for guiding the shutter.

The valve according to this second embodiment operates in the same manner as the valve according to the first embodiment. When a pressurized fluid penetrates into the valve via the conduit 16', it penetrates into the chamber 19 via the passages 29, 30, 31, 32 and the pressure which is developed in the chamber 19 has the effect of pushing back the shutter by compressing the spring 15'. The movement back of the shutter has the effect of opening the outlet orifice 17', leading to a pressure drop in the chamber 19, and of closing the inlet conduit 16' of the shutter. The shutter may then move forward under the thrust of its spring 15'.

The valve according to the second embodiment has the advantage of being able to be used with fluids having a relatively high viscosity. It lends itself particularly well to the dispensing of food products, such as jam, mustard, etc.

The passages between the frustoconical portion 10' of the shutter and the front of the latter may have innumerable shapes and may be of any number. Two alternative forms are shown, by way of example, in FIGS. 6 and 7.

Figure 6:
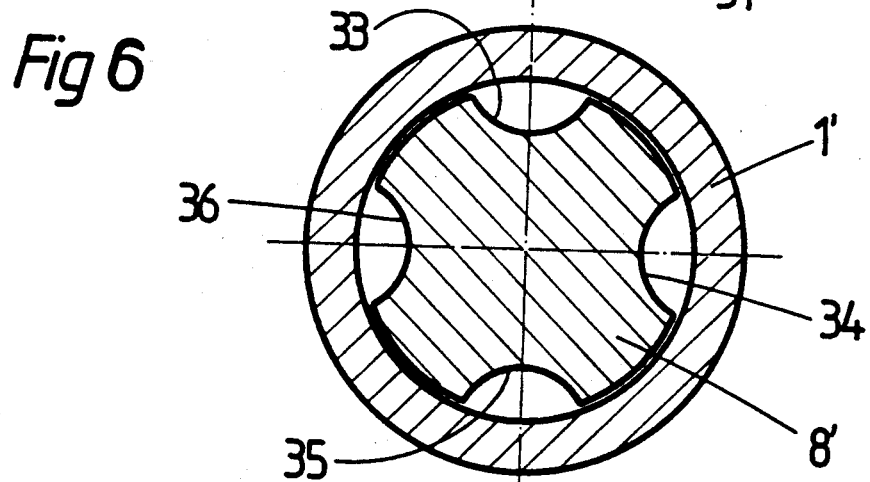
FIGS. 6 and 7 represent alternative forms of the second embodiment.
Figure 7:
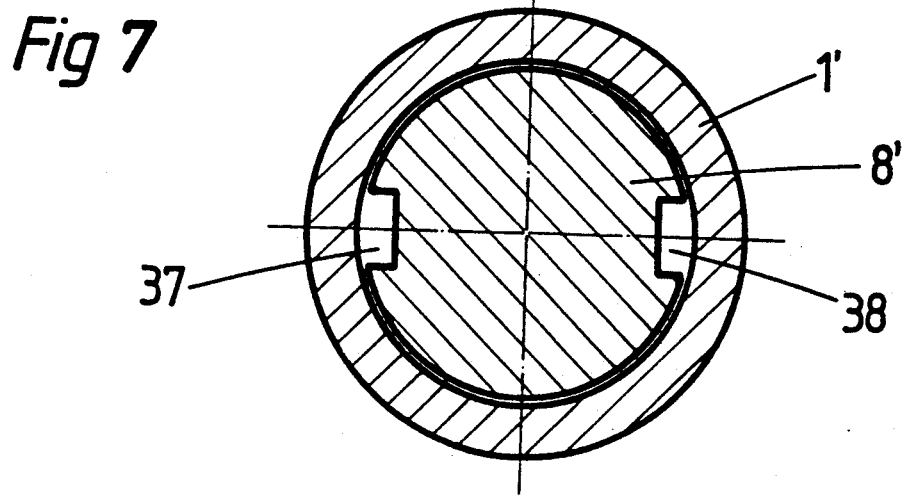

According to FIG. 6, the passages are constituted by four grooves 33, 34, 35, 36 of rounded shape. According to FIG. 7, the passages are constituted by two diametrically opposed slots 37 and 38 of rectangular cross-section.

The constituent portions of the valve according to the invention are simple to produce and the assembly of the valve may be carried out easily and automatically.

In the case where the shutter 8, or alternatively 8', is made of synthetic material, the O-ring seal 9 may be replaced by a lip or a skirt made as one part with the shutter.

I claim:

1. An automatic regulating valve for pressurized fluid, comprising a valve body (1, 3; 1', 3') comprising a chamber (4; 4') having a cylindrical bore (5; 5'), at least one lateral inlet orifice (16; 16') for the fluid, at least one frontal outlet orifice (17; 17') and at least one orifice (18; 18') bringing into permanent communication the bottom of the cylindrical bore of the chamber with the outside, a shutter (8; 8') constituted by a body of revolution which is axially movable in said chamber and a cylindrical portion of which, engaged in the cylindrical bore of the chamber, is provided with a sealing ring (9; 9'), and a spring (15; 15') working in compression between the shutter and the bottom of the cylindrical bore in order to maintain the shutter closed, the inlet orifice (16; 16') emerging between the ring and the outlet orifice, the valve furthermore being arranged such that the passage cross-section between the shutter and the wall of the chamber decreases when the shutter moves back under the effect of the pressure of the fluid, wherein the chamber has a frustoconical portion (6; 6') into which the inlet orifice (16; 16') emerges and wherein the shutter (8; 8') has, in front of the cylindrical portion provided with said ring (9; 9'), a frustoconical portion (10; 10') similar to that of the chamber and at least one passage (12, 13; 29, 30, 31, 32) between the frustoconical portion and the front of the shutter, the length of the frustoconical portion being such that, in the closed position, a space remains between the frustoconical surfaces of the shutter and of the chamber.

2. The valve as claimed in claim 1, wherein said passage is constituted by a radial conduit (12) emerging between the seal (9) and the frustoconical portion of the shutter and by a non-traversing axial conduit (13) communicating with the radial conduit and emerging at the front of the shutter, the orifice of the radial conduit being at the narrow end of the frustoconical portion of the chamber in the closed position of the shutter.

3. The valve as claimed in claim 2, wherein the chamber (4) and the shutter (8) have a second cylindrical portion (7, 11) for guiding the shutter, these two cylindrical portions being substantially of the same diameter.

4. The valve as claimed in claim 1, wherein said passage (29, 30, 31, 32; 33, 34, 35, 36; 37, 38) is located at the periphery of the shutter, between its frustoconical portion and its frontal portion.

5. The valve as claimed in claim 4, wherein the shutter has a plurality of passages in the form of flats (29 to 32) or of grooves (33 to 36; 37, 38) parallel to the axis of the shutter.

6. The valve as claimed in claim 4, wherein the shutter (8') has, in front of said passage (29 to 32), a portion (25) of cross-section substantially less than the cross-section of the chamber and is terminated by a frustoconical portion (26) engaging with a frustoconical seat (27) surrounding the outlet orifice (17').

7. The valve as claimed in claim 1, in which the shutter is made from synthetic material, wherein the leak-tight seal or the shutter is constituted by a lip or skirt made as one part with the shutter.

* * * * *